United States Patent [19]
Hayashino et al.

[11] Patent Number: 5,734,972
[45] Date of Patent: Mar. 31, 1998

[54] AUTOMATIC FREQUENCY CONTROLLER

[75] Inventors: Hiroshi Hayashino, Takarazuka; Yasuo Harada, Kobe; Tomohiro Kimura, Kawachinagano; Yasuhiro Uno, Katano, all of Japan

[73] Assignee: Matsushita Electric Industrial Co., Ltd., Osaku-fu, Japan

[21] Appl. No.: 621,340

[22] Filed: Mar. 25, 1996

[30] Foreign Application Priority Data

Mar. 28, 1995 [JP] Japan ..................... 7-069827

[51] Int. Cl.$^6$ ..................................... H04B 1/18
[52] U.S. Cl. ..................... 455/182.2; 375/344
[58] Field of Search ................. 455/182.2, 192.2, 455/164.1, 257, 258; 375/344

[56] References Cited

U.S. PATENT DOCUMENTS

| | | | |
|---|---|---|---|
| 3,919,651 | 11/1975 | Le Mouel | 329/304 |
| 3,919,653 | 11/1975 | Le Mouel | 329/304 |
| 5,495,506 | 2/1996 | Shoji | 375/344 |
| 5,579,346 | 11/1996 | Kanzaki | 375/344 |

FOREIGN PATENT DOCUMENTS 176994   7/1995   Japan.

*Primary Examiner*—Thomas Mullen
*Attorney, Agent, or Firm*—Wenderoth, Lind & Ponack

[57] ABSTRACT

A pilot signal (a signal having known phase information and a prescribed length) is inserted at a prescribed time interval in a signal transmitted from a transmitting end to a receiving end. An arc tangent operation circuit (22) performs an operation for arc tangent of the pilot signal in a received signal to obtain a phase of the pilot signal. A phase error operation circuit (24) determines for a phase error between the known phase information previously held in a memory (23) and an output from the arc tangent operation circuit (22). A linear approximation circuit (25) takes an output from the phase difference operation circuit (24) as a linear function of time, and linear-approximates the output. A frequency error operation circuit (26) obtains for a frequency error from a slope of an output from the linear approximation circuit (25). In response to the obtained frequency error, control of an oscillation frequency of a variable frequency oscillation circuit allows rapid automatic frequency control with high accuracy.

4 Claims, 3 Drawing Sheets

AUTOMATIC FREQUENCY CONTROLLER

BACKGROUND OF THE INVENTION

1. Field of the Invention

This invention relates to automatic frequency controllers, and more particularly, to an automatic frequency controller in use at a receiver's side in digital transmission.

2. Description of the Background Art

In recent years, in CATV (community antenna television), mobile communications etc., which attract a significant amount of attention, a frequency converter is generally provided in a receiver to downconvert a center frequency of a received signal to an intermediate frequency. However, since frequency stability of the receiver is not high, automatic frequency control is required. Especially, in multicarrier transmission multiplexing of a plurality of modulating waves in the frequency range, automatic frequency control with higher accuracy is required.

A conventional automatic frequency controller is subsequently described referring to FIG. 5 of the drawings. FIG. 5 is a block diagram showing a structure of the conventional automatic frequency controller. In FIG. 5, the conventional automatic frequency controller includes a frequency converter 21, an intermediate frequency amplification circuit 32, a frequency demodulation circuit 33, an integration circuit 34 and a local oscillator 35.

The frequency converter 21 converts a center frequency of a received signal to an intermediate frequency. The frequency demodulation circuit 33 converts frequency deviation of the intermediate frequency signal to voltage deviation. The integration circuit 34 integrates the outputted voltage of the frequency demodulation circuit 33 to obtain a center electric potential of voltage deviation. A local oscillation frequency of the local oscillator 35 corresponds to an output from the integration circuit 34 and is provided for the frequency converter 21.

Operation of the conventional automatic frequency controller constructed as described above is subsequently described in more detail.

Assume that the intermediate frequency is varied by $\Delta f$ in accordance with frequency variation of the local oscillator 35. The signal of the intermediate frequency varied by $\Delta f$ is provided for the frequency demodulation circuit 33 through the intermediate frequency amplification circuit 32. The frequency demodulation circuit 33 converts frequency deviation to voltage deviation. An output from the frequency demodulation circuit 33 is provided for the integration circuit 34 for integration. This allows a voltage error $\Delta V$ where a base band component is suppressed to be obtained. $\Delta V$ is the voltage error with respect to the frequency error $\Delta f$. The voltage error $\Delta V$ is provided as a control signal for the local oscillator 35 to control its oscillation frequency, thereby holding the intermediate frequency constant.

In the above configuration, however, the performance of the automatic frequency controller is significantly influenced by a characteristic of the frequency demodulation circuit 33. Therefore, there has been a problem that a temperature characteristic and an elapsed time characteristic of the frequency demodulation circuit 33 may degrade frequency stability, resulting in a requirement for frequent adjustment.

SUMMARY OF THE INVENTION

Therefore, an object of the present invention to provide an automatic frequency controller capable of precisely obtaining a frequency error and promptly controlling frequency with high accuracy.

To attain the above object, an automatic frequency controller of the present invention comprises, a frequency conversion portion receiving a modulated signal including a pilot signal having known phase information and a prescribed length inserted at a prescribed time interval, and converting a center frequency of the modulated signal, a pilot signal extraction portion extracting the pilot signal in an output from the frequency conversion portion, a phase operation portion obtaining a phase of the pilot signal extracted by the pilot signal extraction portion, a memory portion previously storing a reference phase of the pilot signal, a phase difference operation portion obtaining a phase difference between an output from the phase operation portion and an output from the memory potion, a frequency error operation portion obtaining a frequency error from an output of the phase difference operation portion, and a variable frequency oscillation portion controlling an oscillation frequency of a frequency signal to be input to the frequency conversion portion in response to an output from the frequency error operation portion.

As described above, in the automatic frequency controller of the present invention, the phase of the pilot signal inserted in the received signal at a constant period and the reference phase of the pilot signal previously held in the memory are compared to obtain its phase difference, and a frequency error is obtained on the basis of the phase difference. Accordingly, as compared with the conventional controller obtaining the frequency error from received data itself, the frequency error can be obtained more accurately. Therefore, automatic frequency control of the received signal can be promptly performed with high accuracy.

Considering a noise occurring on a transmission path, a phase difference obtained in the phase difference operation portion is continuously and randomly varied. When a noise component is large, frequency control may not catch up with the variation of the noise component and unstabilize the operation of a frequency control loop. Therefore, frequency control may be performed by linear-approximating the output of the phase difference operation portion, disregarding the noise component which is superposed on a transmission signal on the transmission path. This allows stabilization of the frequency control loop. Although the noise occurring on the transmission path goes through the frequency conversion portion, this noise component can be additionally eliminated by a simple noise eliminating circuit (e.g., a high-cut filter).

When there is a nonlinear characteristic in the transmission path, such as in CATV and mobile communications, its amplitude variation varies its phase. In a linear transmission path, phase is constant with respect to amplitude variation, while in a nonlinear transmission path, phase variation is not constant with respect to amplitude variation. Therefore, since a phase of a received signal influenced by nonlinearity on the transmission path is varied by its amplitude variation, phase information of the received signal is distorted. On the other hand, a phase of a signal having a constant amplitude is constant even if the signal is influenced by nonlinearity on the transmission path. Therefore, phase variation may be held constant by using a signal having a constant amplitude as a pilot signal. This allows easy extraction of phase information even if the received signal is distorted by the influence of nonlinearity on the transmission path.

Moreover, in a preferred embodiment, the phase operation portion may obtain a phase by performing an operation for determining the arc tangent of the extracted pilot signal.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
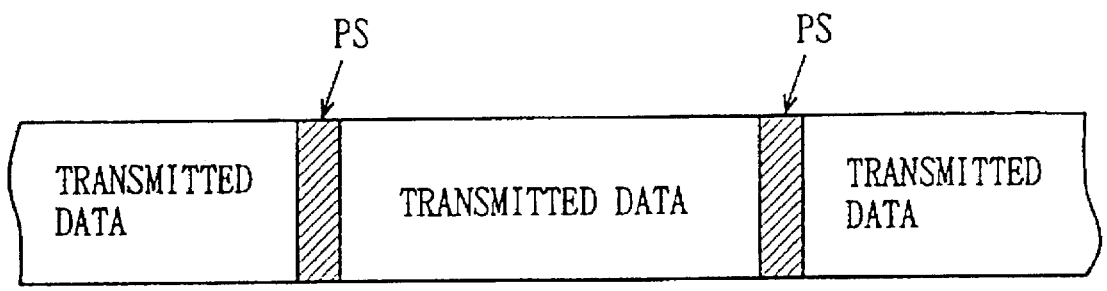
FIG. 1 is a diagram showing a data structure transmitted from a transmitting end to a receiving end.

An automatic frequency controller of an embodiment of the present invention is subsequently described referring to the drawings.

FIG. 1 shows, a signal that the automatic frequency controller of the present embodiment receives; the signal transmitted from a transmitting end is subsequently described. As shown in FIG. 1, the transmitting end transmits a pilot signal PS with transmission data. The pilot signal PS is inserted at a constant time period.

Figure 2:
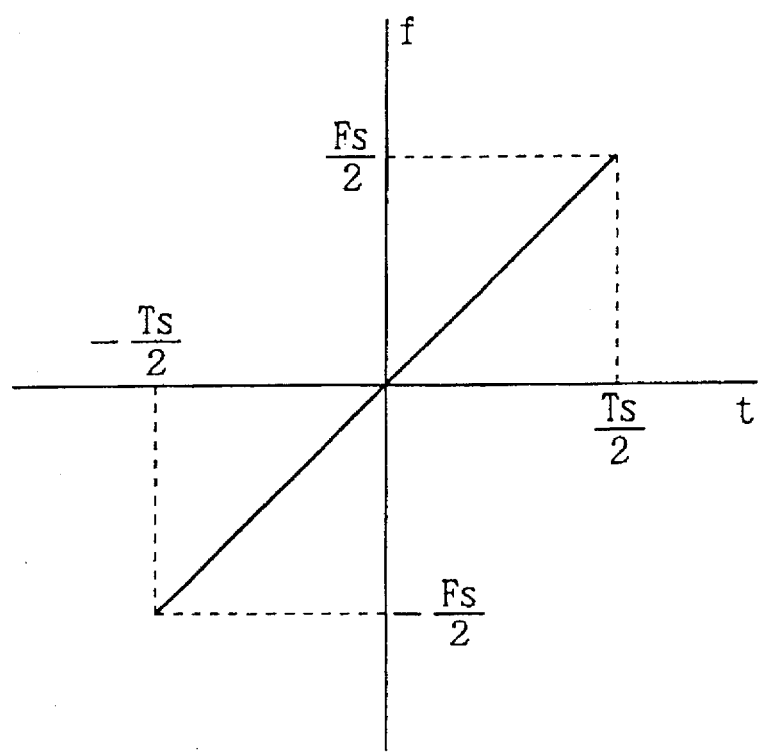
FIG. 2 is a diagram showing the relationship of time-to-frequency of a pilot signal used in one embodiment of the present invention.

FIG. 2 is a diagram showing the relationship of time-to-frequency when a signal which linear-functionally varies in response to time variation at a prescribed time period (so-called frequency sweep signal) is used as the pilot signal PS shown in FIG. 1.

As shown in FIG. 2, in accordance with time variation from $-T_s/2$ to $T_s/2$, the frequency of the pilot signal linear-functionally varies from $-F_s/2$ to $F_s/2$. The relationship of time t to frequency f(t) is represented in the following equation (1).

$$f(t) = (F_s/T_s) \cdot t \quad (1)$$

Time variation $d\theta/dt$ in phase is represented in the following equation (2).

$$d\theta/dt = 2\pi f(t) \quad (2)$$

Therefore, phase $\theta(t)$ of the pilot signal is represented as a function of time in the following equation (3).

$$\begin{aligned} \theta(t) &= \int 2\pi f(t) dt \\ &= \int 2\pi (F_s/T_s) t \, dt \\ &= \pi (F_s/T_s) t^2 \end{aligned} \quad (3)$$

Therefore, an amplitude of the pilot signal is taken as a constant value A, the pilot signal x(t) is represented in an orthogonal space in the following equation (4).

$$\begin{aligned} x(t) &= A \cdot \exp\{j\theta(t)\} \\ &= A \cdot \exp\{j\pi(F_s/T_s)t^2\} \end{aligned} \quad (4)$$

According to the above, a signal where its frequency linear-functionally varies according to time variation in the prescribed time period is easily formed by varying time t in the prescribed time period by the equation (4).

Figure 3:
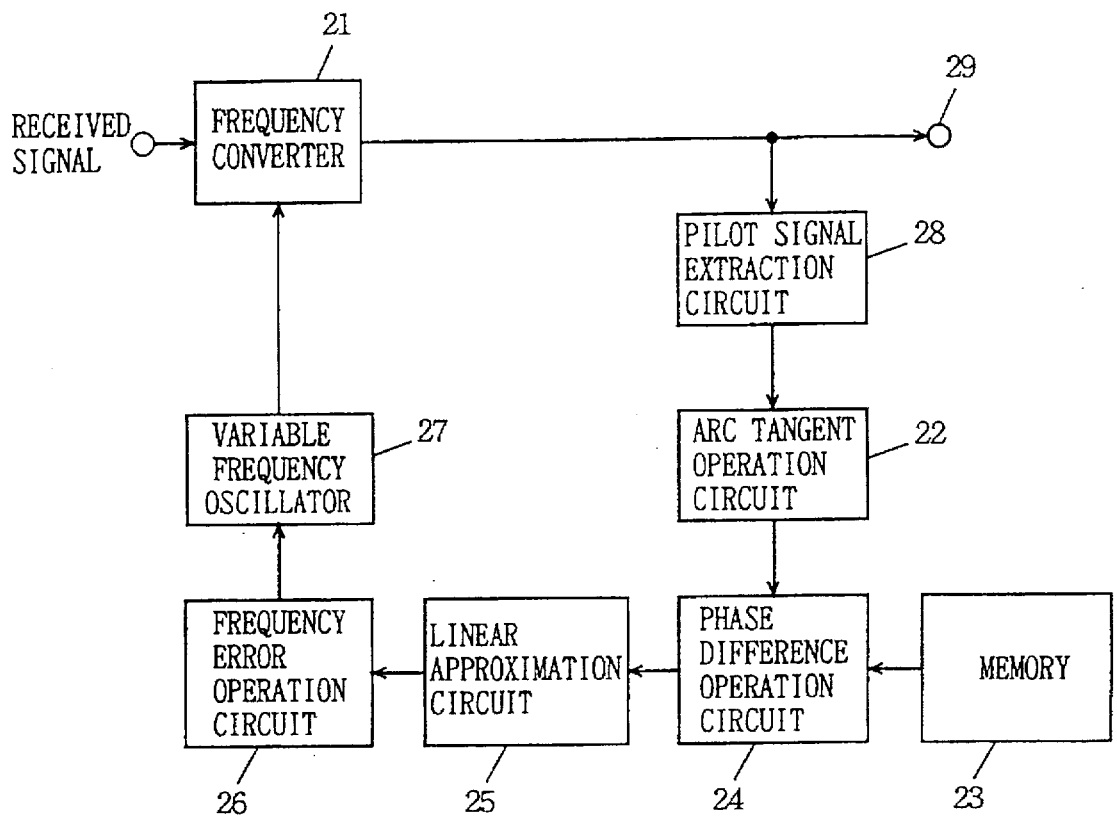
FIG. 3 is a block diagram showing a structure of an automatic frequency controller according to the embodiment of the present invention.

FIG. 3 is a block diagram showing a structure of the automatic frequency controller according to the embodiment of the present invention. In FIG. 3, the automatic frequency controller of the present embodiment includes a frequency converter 21, an arc tangent operation circuit 22, a memory 23, a phase difference operation circuit 24, a linear approximation circuit 25, a frequency error operation circuit 26, a variable frequency oscillator 27, a pilot signal extraction circuit 28 and an output terminal 29.

The frequency converter 21 multiplies a received signal by an output from the variable frequency oscillator 27 to convert a center frequency of the received signal to an intermediate frequency. The pilot signal extraction circuit 28 examines the correlation between an output from the frequency converter 21 and a basic pattern of the pilot signal previously stored therein to extract only the pilot signal from the output of the frequency converter 21. The arc tangent operation circuit 22 performs an operation for determining the arc tangent of the pilot signal extracted by the pilot signal extraction circuit 28 to obtain a phase of the pilot signal. The memory 23 previously holds a reference phase of the pilot signal. The phase difference operation circuit 24 determines a phase error between the phase of the pilot signal in the received signal outputted from the arc tangent operation circuit 22 and the reference phase of the pilot signal previously held in the memory 23. The linear approximation circuit 25 linear-approximates an output from the phase difference operation circuit 24. The frequency error operation circuit 26 performs an operation for obtaining a frequency error by using an output from the linear approximation circuit 25. An output from the frequency error operation circuit 26 is provided as a frequency control signal for the variable frequency oscillator 27. An oscillation frequency of the variable frequency oscillator 27 varies in response to the output from the frequency error operation circuit 26. The output from the frequency error operation circuit 26 is provided for the frequency converter 21. An output from the frequency converter 21 is provided for a demodulation circuit (not shown) through the output terminal 29.

Operation of the automatic frequency controller of the present invention constructed as described above is subsequently described in more detail.

A frequency error $\Delta f$ is between the center frequency of the received signal and the oscillation frequency of the variable frequency oscillator 27, and when the influence of the transmission path of the received signal is disregarded, a pilot signal Xif(t) in the output from the frequency converter 21 is represented in the following equation (5).

$$Xif(t) = x(t) \cdot \exp(j2\pi\Delta f t) \quad (5)$$

A phase $\theta if(t)$ of the pilot signal in the output from the frequency converter 21 can be obtained by performing an operation for determining the arc tangent of the pilot signal Xif(t) by the arc tangent operation circuit 22, which is represented in the following equation (6).

$$\theta if(t) = \pi(F_s/T_s)t^2 + 2\pi\Delta f t \quad (6)$$

When a phase of the pilot signal previously held in the memory 23 is represented as $\theta(t)$, an output $\Delta\theta(t)$ of the phase difference operation circuit 24 is a difference between the equation (6) and θ(t), which is represented in the following equation (7).

$$\Delta\theta(t) = \theta if(t) - \theta(t) \quad (7)$$
$$= 2\pi\Delta ft$$

According to the equation (7), the output Δθ(t) from the phase difference operation circuit 24 is a linear function of time t. However, Δθ(t) becomes a linear function of time t only when the influence of the transmission path of the received signal is disregarded, while Δθ(t) does not become a linear function when the influence of the transmission path is considered. Therefore, the output Δθ(t) from the phase difference operation circuit 24 is taken as a linear function for linear approximation in the linear approximation circuit 25. The slope of the linear function, which is an output from the linear approximation circuit 25, is represented in the following equation (8).

$$d\theta(t)/dt = 2\pi\Delta f \quad (8)$$

Therefore, in the frequency error operation circuit 26, the frequency error Δf with respect to the oscillation frequency of the variable frequency oscillator 27 can be obtained by the output dθ(t)/dt from the linear approximation circuit 25 based on the following equation (9).

$$\Delta f = (1/2\pi) \cdot \{d\theta(t)/dt\} \quad (9)$$

The frequency error Δf obtained as in the above manner is inputted into the variable frequency oscillator 27 to vary the frequency by Δf from the oscillation frequency previously set, and an output from the variable frequency oscillator 27 is provided for the frequency converter 21, whereby the frequency can be rapidly stabilized with high accuracy to realize an outstanding automatic frequency controller.

When the output Δθ(t) from the phase difference operation circuit 24 is frequency-controlled without being linear-approximated, the frequency difference is continuously randomly varied by the noise component superposed on the transmission signal on the transmission path. Accordingly, frequency control cannot catch up with the variation of the noise component and the operation of a frequency control loop is unstable. Therefore, in the above embodiment, the output Δθ(t) from the phase difference operation circuit 24 is linear-approximated in the linear approximation circuit 25 to frequency-control disregarding the noise component superposed on the transmission signal on the transmission path, thereby stabilizing the frequency control loop. In the above embodiment, the noise component occurring on the transmission path goes through the frequency converter 21. This noise component is additionally eliminated by a noise eliminating circuit (e.g., high cut filter) not shown.

Figure 4:
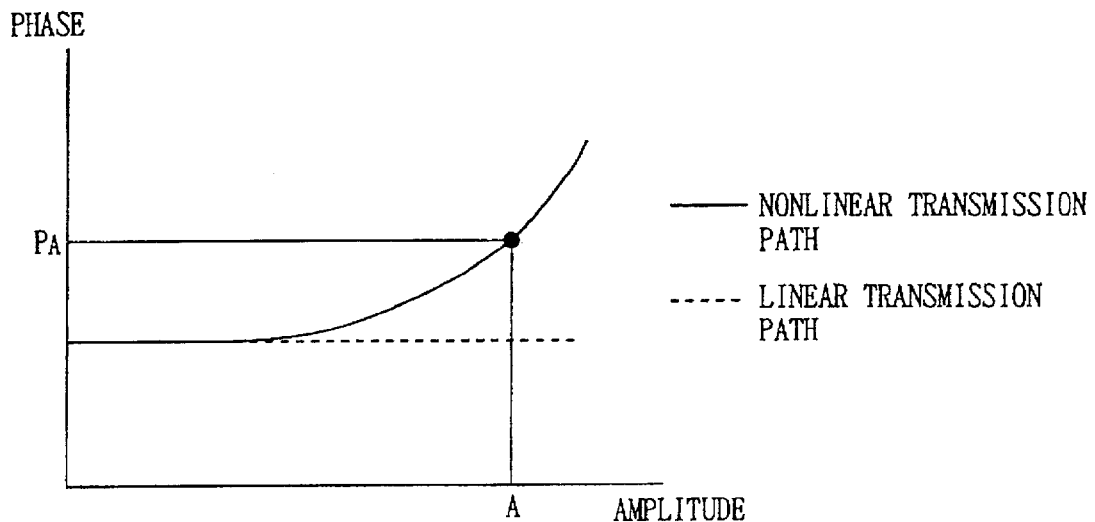
FIG. 4 is a diagram showing an influence upon phase by amplitude on a nonlinear transmission path.

When there is a nonlinear characteristic in the transmission path, such as in CATV and mobile communications, its amplitude variation varies its phase variation. The relationship between amplitude and phase is shown in FIG. 4. In a linear transmission path, phase is constant with respect to amplitude variation, while in a nonlinear transmission path, phase variation is not constant with respect to amplitude variation. Therefore, since a phase of the received signal influenced by nonlinearity on the transmission path is varied by its amplitude variation, phase information of the received signal is distorted. On the other hand, the phase of a signal having a regularly constant amplitude is constant even if the signal is influenced by nonlinearity on the transmission path (point (A, $P_A$) in FIG. 4, for example). Therefore, use of a signal having a constant amplitude as a pilot signal allows phase variation to be constant and the phase information to be easily extracted even if the amplitude of the received signal is distorted by influence of nonlinearity on the transmission path. These effects are enabled if the amplitude of the pilot signal is constant. Therefore, use of a signal having a constant amplitude and known phase information (a signal having a constant frequency, for example) may also enable the same effects.

Figure 5:
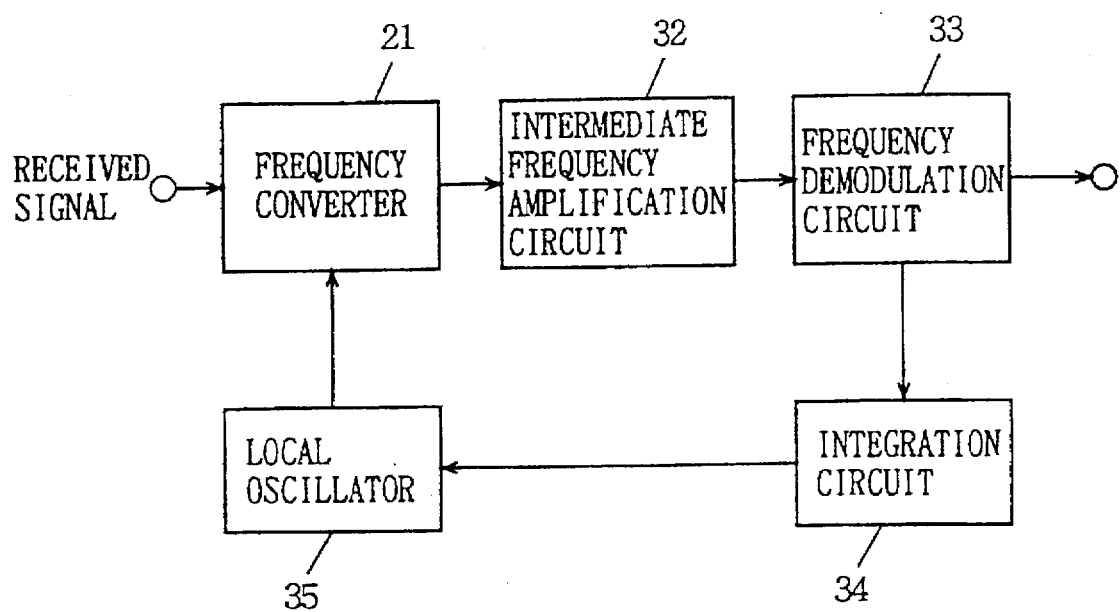
FIG. 5 is a block diagram showing the structure of the conventional automatic frequency controller.

The arc tangent operation circuit 22, the phase difference operation circuit 24, the linear approximation circuit 25 and the frequency error operation circuit 26 can be easily realized by a digital signal processor (DSP), which allows more stable operation, as compared with the frequency modulation circuit 33 (FIG. 5) in the conventional automatic frequency controller.

While the invention has been described in detail, the foregoing description is in all aspects illustrative and not restrictive. It is understood that numerous other modifications and variations can be devised without departing from the scope of the invention.

What is claimed is:

1. An automatic frequency controller comprising:

frequency conversion means for converting a center frequency of a received modulated signal into an intermediate frequency, the received modulated signal having a pilot signal inserted therein at a prescribed time interval, the pilot signal having known phase information and a prescribed length;

pilot signal extraction means for extracting the pilot signal in an output from said frequency conversion means;

phase operation means for obtaining a phase of the pilot signal extracted by said signal extraction means;

memory means for storing a reference phase of the pilot signal;

phase difference operation means for determining a phase difference between an output from said phase operation means and an output from said memory means;

frequency error operation means for determining a frequency error from an output from said phase difference operation means; and variable frequency oscillation means for controlling an oscillation frequency of a frequency signal to be input to said frequency conversion means in response to an output from said frequency error operation means.

2. The automatic frequency controller according to claim 1, further comprising linear approximation means for linear-approximating the output from said phase difference operation means: wherein said frequency error operation means determines a frequency error from an output from said linear approximation means.

3. The automatic frequency controller according to claim 1, wherein a signal having the known phase information and a constant amplitude is used as the pilot signal.

4. The automatic frequency controller according to claim 3, wherein said phase operation means performs an operation for determining the arc tangent of the pilot signal extracted by said pilot signal extraction means to obtain the phase of the pilot signal.

\* \* \* \* \*